United States Patent [19]

Holt

[11] 4,441,477

[45] Apr. 10, 1984

[54] ECONOMIZER

[76] Inventor: George R. Holt, 1175 Grove Ave., Imperial Beach, Calif. 92032

[21] Appl. No.: 287,933

[22] Filed: Jul. 29, 1981

[51] Int. Cl.³ .......................................... F02M 31/00
[52] U.S. Cl. .................................... 123/557; 123/548; 261/36 A; 261/DIG. 6
[58] Field of Search ............... 123/523, 522, 524, 548, 123/557; 261/36 A, DIG. 6, DIG. 83, 115

[56] References Cited

U.S. PATENT DOCUMENTS

| | | | |
|---|---|---|---|
| 890,970 | 6/1908 | Durr | 261/36 A |
| 1,121,868 | 12/1914 | Riotte | 123/548 |
| 1,271,181 | 7/1918 | Lenhart | 261/DIG. 6 |
| 1,411,010 | 3/1922 | Garuson | 261/DIG. 6 |
| 1,465,574 | 8/1923 | Bannister | 123/523 |
| 1,980,496 | 11/1934 | Musselwhite | 261/36 A |
| 2,633,836 | 4/1953 | Cox | 123/523 |
| 3,279,770 | 10/1966 | Parker | 261/36 A |
| 3,792,688 | 2/1974 | Grainger | 261/DIG. 83 |
| 3,957,468 | 5/1976 | Voth | 261/36 A |
| 4,020,811 | 11/1977 | LaForce | 123/548 |

Primary Examiner—Ronald H. Lazarus
Attorney, Agent, or Firm—Curtis, Morris & Safford

[57] ABSTRACT

A fuel economizer system for use with an internal combustion engine comprises an evaporation chamber into which gasoline is sprinkled, and in which evaporated gasoline is mixed with air; a two-way safety valve arrangement permitting the mixture to be drawn from the chamber to the intake manifold of the engine but preventing backfires from reaching the chamber; and a return fuel line for recycling the sprinkled gasoline by returning it from the chamber to the fuel tank. A portion of the return line in contact with the exhaust pipe picks up exhaust heat to energize the recycled fuel.

12 Claims, 4 Drawing Figures

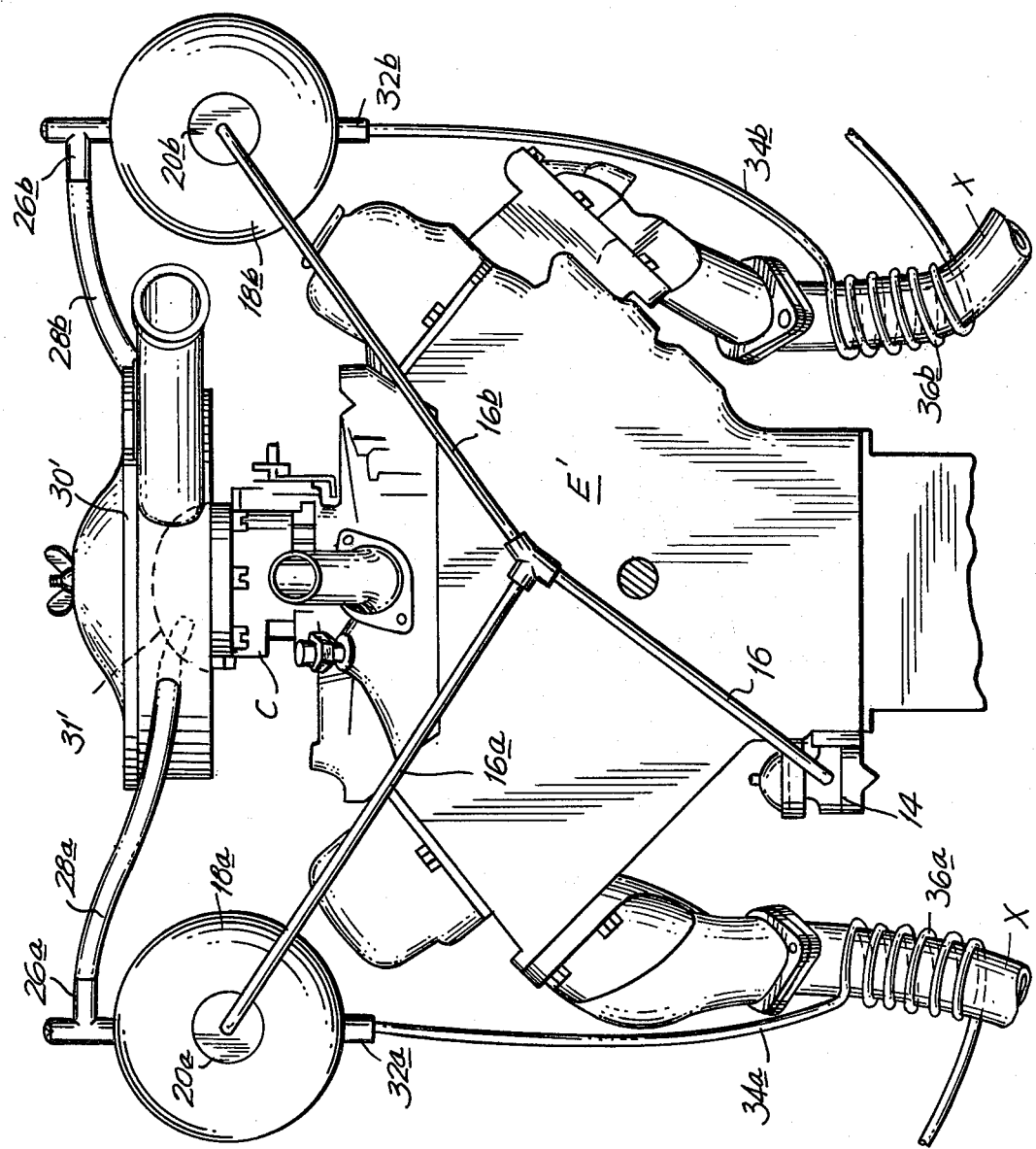
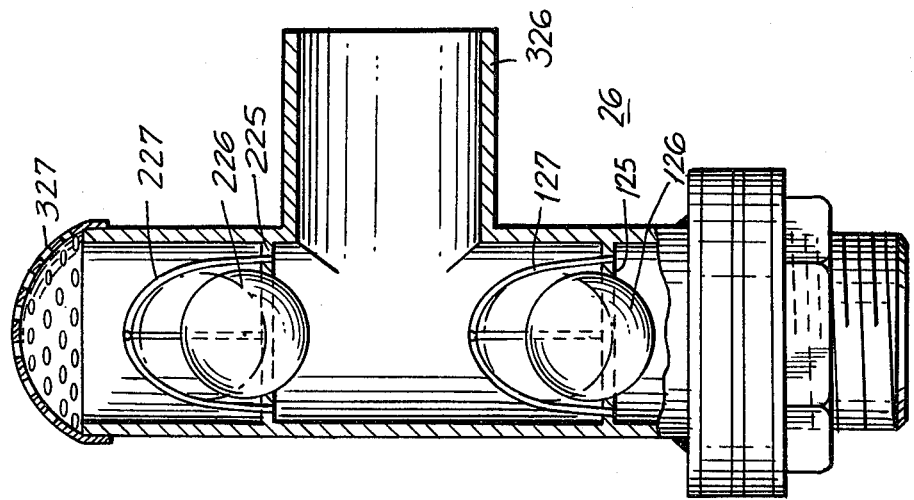

ECONOMIZER

BACKGROUND OF THE INVENTION

This invention relates to internal combustion engines and particularly relates to an economizer system in which fuel vapors are mixed with air and are fed to the intake of the engine.

In present gasoline engines, either a carburetor or a fuel injector is used to mix gasoline and air prior to combustion. In either case, the gasoline and air are not mixed completely, resulting in less than optimum efficiency and in other problems as well.

In a carburetor system, a jet of fuel is sprayed into a stream of air. A resulting mist of gasoline is drawn into the cylinders. Because the gasoline is not completely vaporized when supplied to the cylinders, it is not completely burned during combustion. Furthermore, some of the unburned fuel will collect on the cylinder walls. This will wash the lubricating oil from the cylinder, so that the cylinder walls tend to erode.

In a fuel injection system, the problems are somewhat more complex, but the results are the same. Some of the fuel remains unburned and some of the fuel collects on the cylinder walls to wash away the lubricating oil.

OBJECTS AND SUMMARY OF THE INVENTION

Accordingly, it is an object of this invention to provide an economizer system that avoids the drawbacks of the conventional systems mentioned above.

Another object of this invention is to provide an economizer system that mixes gasoline vapors with air so as to achieve maximum fuel economy.

A further object of this invention is to provide an economizer system that is safe to use despite the occurrences of backfire.

According to one embodiment of this invention, an economizer system includes a fuel evaporation chamber in which gasoline, under pressure from the fuel pump of an associated engine, is sprinkled. The vapors from the sprinkled gasoline are mixed with air in the chamber, and are drawn to the intake manifold of the engine. The unevaporated gasoline is recycled, preferably back to the main gasoline tank. A two-way safety valve is included between the chamber and the intake manifold. This safety valve permits flow of the gasoline vapor and air from the chamber, but prevents any backfire from reaching the chamber, rather venting it off to the atmosphere. A coil of tubing in the line returning fuel to the tank picks up heat from the exhaust manifold to boost the energy of the returned gasoline, which has lost some of its thermal energy by evaporation.

Other objects, features and advantages of this invention will be apparent from the following description when read in conjunction with the accompanying drawings.

BRIEF DESCRIPTION OF THE DRAWINGS

FIG. 2 illustrates one version of the two-way safety valve used in this invention.

FIG. 3 shows an alternative arrangement of the economizer of this invention.

DETAILED DESCRIPTION OF A PREFERRED EMBODIMENT

Figure 1A:
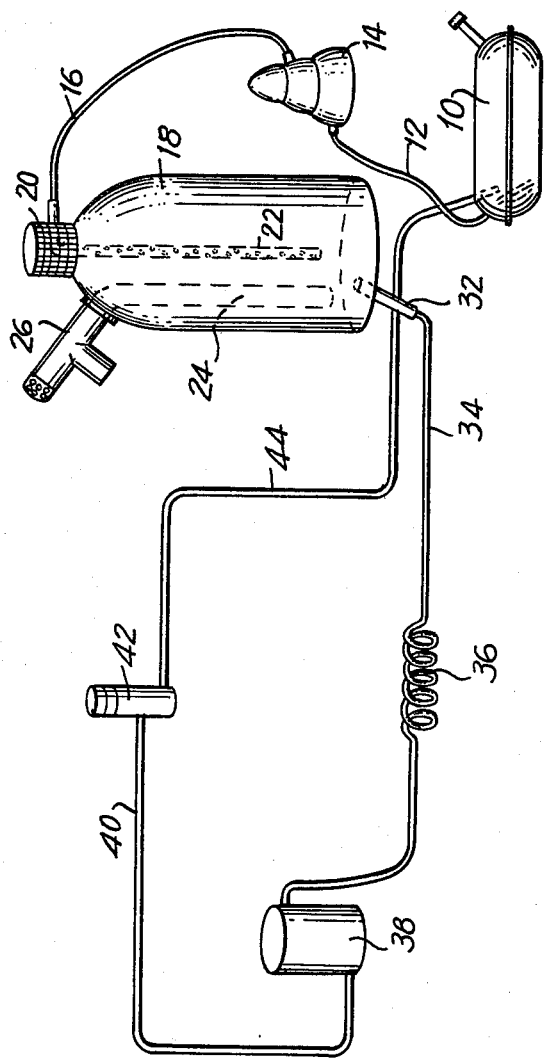
FIG. 1A is a systematic diagram of an economizer according to this invention.
Figure 1B:
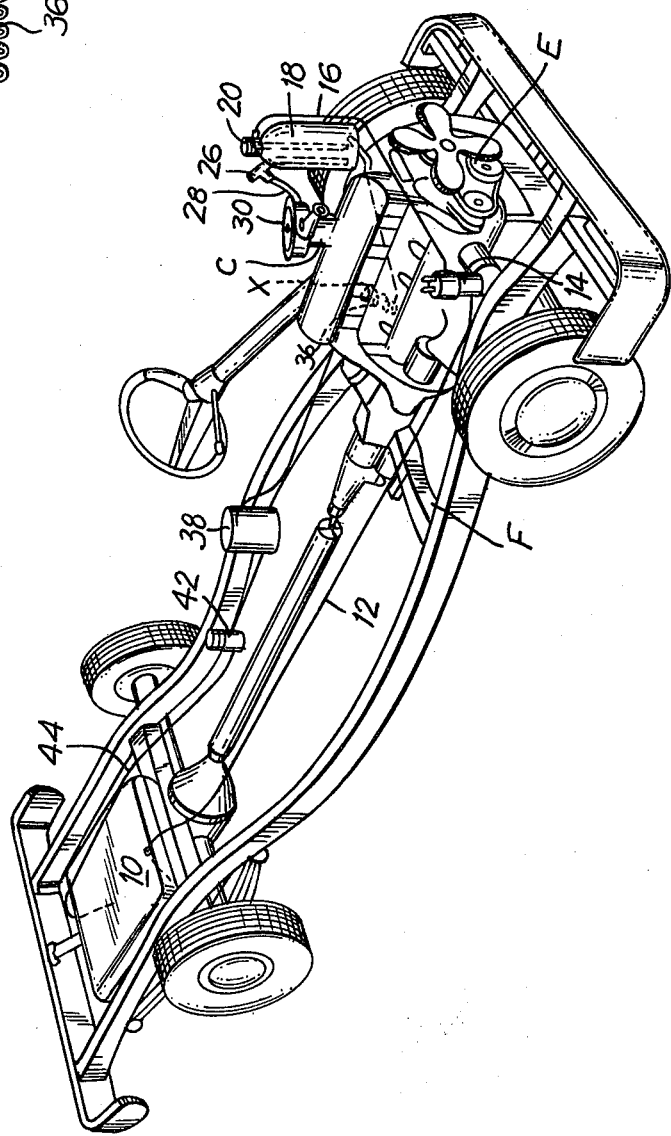
FIG. 1B is a perspective view showing the same in relation to the basic structure of an automobile.

With reference initially to FIGS. 1A and 1B, an economizer system according to this invention is here shown in a form suitable for a passenger car. In the car, an in-line engine E is mounted on a frame F. A carburetor C provides the passageway through which air is admitted to the intake of the engine E. An exhaust pipe X leads combusted fuel and air mixture from the engine. A fuel tank 10 is located on the frame F remote from the engine E.

Here the economizer system provides fuel-air mixture to the carburetor C, which is not connected to the fuel line.

The economizer system is formed generally as a loop. The fuel tank 10 is coupled by a fuel line 12 to a fuel pump 14 which pumps the gasoline through a line 16 to a mixer chamber 18. The fuel line 16 is connected to an inlet device 20, which is basically an air filter and a fuel nipple, at an opening of the chamber. The inlet device is coupled to a sprinkler pipe 22 that extends from the opening into the interior of the chamber 18. This pipe 22 is provided with a multiplicity of perforations so that the gasoline is sprinkled into the chamber, and can be packed, for example with a bundle of rods, to provide resistance to the flow of gasoline. Here, gasoline evaporates in the chamber 18, and air mixed with the evaporated gasoline is led out from the chamber 18 by an outlet tube 24 to a two-way safety valve 26, and thence through a mixture line 28 to a carburetor adaptor 30 atop the carburetor C. The outlet tube 24 here extends down to near the bottom of the chamber 18 so that air entering the opening at the top will travel a maximum distance before being drawn into the outlet tube 24. This assures good mixing of the gasoline vapors and air.

The gasoline that is sprinkled into the chamber 18 collects at the bottom of it, where a bleeder pipe 32 draws the collected liquid gasoline off. The bleeder pipe 32 feeds the gasoline back toward the tank 10 through a return line 34. A preheater arrangement 36, here formed of a number of coils of the return line 34, is coiled around the exhaust pipe X to heat the fuel that is returned to the tank 10.

In the illustrated embodiment, the fuel tank 10 is elevated somewhat above the bottom of the chamber 18, making gravity-powered return of the gasoline impossible. Therefore, a secondary return-fuel tank 38 receives the gasoline from return line 34. This tank 38 is coupled by a line 40 to an electric fuel pump 42, which then pumps the returned gasoline through another line 44 back to the tank 10. A sensor is provided in the secondary return fuel tank 38 to switch the electric fuel pump 42 on when the level in the tank 38 reaches a predetermined level.

Detail of the two-way safety valve 26 is shown in FIG. 2. Here, the valve 26 is basically a hollow tee in which a first check valve is located in one arm of the tee, a second check valve is located in another arm of the tee, and the hollow stem of the tee leads to the carburetor adapter 30. More specifically, the lower check valve includes a ball check with a seat 125, a ball 126 atop the seat 125, and a cage or guide 127 to keep the ball 126 in position. Similarly, the second check valve also includes a ball check with a seat 225, a ball 226, and a cage 227. The part of the safety valve 26 housing the first check valve 125, 126, 127 is coupled to the outlet tube 24. The space between the first check valve 125-127 and the second check valve 225-227 is coupled through a hollow tube 326 to the mixture line 28.

A cap 327 on the part of the valve 26 housing the second check valve 225-227 permits gasses passing through the second check valve to flow through to the atmosphere.

Here, the safety valve 26 is disposed vertically and the balls 126, 226 are held on their seats 125, 225 by gravity. However, a weak spring could be provided to hold the balls in place.

It is evident that the safety valve 26 allows the mixture in the chamber 18 to be drawn into the carburetor C, but will prevent backfire from reaching the chamber 18, rather venting any backfire off and preventing possible explosion of the chamber 18.

Normally, there is a vacuum in the intake manifold of the engine E during operation. Thus, normally, the higher relative pressures in the chamber 18 and in the ambient air keep the first check valve 125-127 open and the second check valve 225-227 closed. However, if there is backfire, the manifold pressure will be momentarily raised. This relatively higher pressure will tend to close the first check valve 125-127 and open the second check valve 225-227.

Here the economizer system is designed for an in-line engine and the chamber 18 is formed as an upright cylinder. The chamber 18 is favorably on the order of about 6-8 inches in diameter and about 18-24 inches long.

Also, the adapter 30 is used to seal the carburetor so that air cannot be drawn through the carburetor except from the chamber 18. The adapter 30 can be readily formed as a dummy air cleaner to substitute for the air cleaner conventionally provided in the car. This enables the adapter 30 to be securely bolted to the carburetor C. A wing nut then holds the adapter 30 securely in place.

FIG. 3 illustrates an alternative embodiment of this invention, here adapted for use with a vee-block engine E', such as a V-6 or V-8. The basic structure of this system is the same as that of FIGS. 1A and 1B, and the same reference numerals are used to identify the same parts. In this system, however, twin cylindrical chambers 18a and 18b are provided, each disposed horizontally alongside a respective bank of cylinders. In this system, which is viewed from in front of the engine E', the intake devices 20a, 20b are located in the front, and are coupled by respective fuel lines 16a, 16b to the fuel pump 14. Respective bleeder pipes 32a and 32b are coupled to return lines 34a, 34b and preheaters 36a, 36b to return gasoline to the tank 10.

Safety valves 26a and 26b are disposed on the upper sides of the cylindrical chambers 18a and 18b. Several such safety valves 26a, 26b can be provided on each chamber 18a, 18b, each connected to the carburetor adapter 30'.

Here the carburetor adapter 30' is shown to include a concave baffle 31' having a circular edge for providing a positive seal against the carburetor C. Mixture lines 28a and 28b lead through this baffle 31' to the carburetor C.

The system of this invention provides only gasoline vapors and air to the engine, while returning the liquid gasoline for recycling. Thus, the engine is operated economically and washing of lubricating oil from the cylinder walls is avoided.

An economizer according to this invention was tested on a six cylinder engine. The engine was not modified except to install the dummy air cleaner adapter in place of the conventional air cleaner, and to disconnect the fuel line 16 from the carburetor C to reconnect it to the device 20. The engine was started and ran successfully, at a variety of speeds, for a period of six consecutive hours.

While several embodiments of this invention have been disclosed, it should be recognized that many variations and modifications are possible without departing from the scope and spirit of the invention, which is to be measured from the following claims.

What is claimed is:

1. An economizer system for use with an internal combustion engine having a fuel tank, a fuel pump, means for feeding fuel from the tank to the pump, an intake manifold, and at least one exhaust conduit, comprising a generally cylindrical fuel evaporation chamber in which fuel vapors are mixed with air including means admitting air into said chamber, the Springling means including a tube extending axially into the chamber and having a multiplicity of perforations. Therein such that the fuel is sprinkled through the perforations into the chamber and sprinkling means the fuel from the fuel pump into the chamber; a two-way safety valve including means permitting flow of fuel vapor and air from the evaporation chamber to the intake manifold for preventing backfire from reaching the chamber but rather venting off said backfire; means connecting said two-way safety valve to the intake manifold; and means for recycling fuel that accumulates in said chamber so that such fuel can be again sprinkled into the chamber, wherein the recycling means includes a secondary fuel tank, a secondary fuel pump, and fuel lines respectively connecting the evaporation chamber to the secondary fuel tank, the secondary fuel tank to the secondary fuel pump, and the secondary fuel pump to the first-mentioned fuel tank so that fuel is returned to the latter from the evaporation chamber.

2. An economizer system according to claim 1, wherein said two-way safety valve includes a first check valve between the chamber and the intake manifold to open for permitting the flow of fuel vapor and air only when the pressure in the chamber exceeds that in the manifold, and a second check valve between the manifold and a point outside the system to open to vent off backfire whenever the pressure in the manifold exceeds ambient atmospheric pressure.

3. An economizer system for use with an internal combustion engine having a fuel tank, a fuel pump, means for feeding fuel from the tank to the pump, an intake manifold, and at least one exhaust conduit, comprising a fuel evaporation chamber in which fuel vapors are mixed with air including means admitting air into said chamber, and means sprinkling the fuel from the fuel pump into the chamber; a two-way safety valve including means permitting flow of fuel vapor and air from the evaporation chamber to the intake manifold while preventing backfire from reaching the chamber but rather venting off said backfire, wherein said two-way safety valve is formed of a hollow tee, with its stem coupled to the intake manifold and with first and second arms coupled to the chamber and to a point outside the system, respectively, with first and second check valves being disposed inside the first and second arms, respectively, the first check valve permitting the flow of fuel vapor and air only when the pressure in the chamber exceeds that in the manifold, and the second check valve venting off backfire whenever the pressure in the manifold exceeds ambient atmospheric pressure; and means for recycling fuel that accumulates in said chamber so that such fuel can be again sprinkled into the chamber.

4. An economizer system for use with an internal combustion engine having a fuel tank, a fuel pump, means for feeding fuel from the tank to the pump, an intake manifold, and at least one exhaust conduit, comprising a generally cylindrical fuel evaporation chamber in which fuel vapors are mixed with air including means admitting air into said chamber, and sprinkling means the fuel from the fuel pump into the chamber the Sprinkling means including a tube extending axially into the chamber and having a multiplicity of perforations. Therein such that the fuel is sprinkled through the perforations into the chamber; a two-way safety valve including means permitting flow of fuel vapor and air from the evaporation chamber to the intake manifold while preventing backfire from reaching the chamber but rather venting off said backfire; means connecting said two way safety valve to the intake manifold; and means for recycling fuel that accumulates in said chamber to the fuel tank so that such fuel can be again sprinkled into the chamber, wherein the recycling means includes heat exchanging means in contact with said exhaust conduit for exhaust heating the recycled fuel returned as liquid to said fuel tank.

5. An economizer system according to claim 1, for use with an engine having two banks of cylinders, wherein a respective pair of evaporation chambers and an associated pair of two-way safety valves are provided coupled to the respective cylinder banks.

6. An economizer system according to claim 5, wherein said evaporation chambers are cylinders disposed with their axes along the length of their respective cylinder banks.

7. An economizer system according to claim 1, for use with an engine having a carburetor, wherein the means connecting the two-way safety valve to the manifold includes a dummy air cleaner containing means forming an enclosure to seal the carburetor from outside air, means connecting the enclosure to the two-way valve, and means holding the dummy air cleaner securely down on the carburetor.

8. An economizer system according to claim 3, wherein each of said first and second check valves includes a ball, a seat, and guide means to keep the ball in position relative to said seat.

9. An economizer system according to claim 4, wherein the recycling means includes a secondary fuel tank, a secondary fuel pump, and fuel lines respectively connecting the evaporation chamber to the secondary fuel tank, the secondary fuel tank to the secondary fuel pump, and the secondary fuel pump to the first-mentioned fuel tank so that fuel is returned to the latter from the evaporation chamber, with the heat exchanging means being disposed in one of said fuel lines.

10. An economizer system according to claim 4, for use with an engine having two banks of cylinders, wherein a respective pair of evaporation chamber and an associated pair of two-way safety valves are provided coupled to the respective cylinder banks.

11. An economizer system according to claim 10, wherein said evaporation chambers are cylinders disposed with their axes along the length of their respective cylinder banks.

12. An economizer system according to claim 6, wherein said sprinkling means include respective tubes extending axially into said evaporation chamber cylinders, each having a multiplicity of perforations therein.

* * * * *

UNITED STATES PATENT AND TRADEMARK OFFICE
CERTIFICATE OF CORRECTION

PATENT NO. : 4,441,477

DATED : April 10, 1984

INVENTOR(S) : George R. Holt

It is certified that error appears in the above—identified patent and that said Letters Patent is hereby corrected as shown below:

Claims 1 and 4 to read as follows:

1. An economizer system for use with an internal combustion engine having a fuel tank, a fuel pump, means for feeding fuel from the tank to the pump, an intake manifold, and at least one exhaust conduit, comprising a generally cylindrical fuel evaporation chamber in which fuel vapors are mixed with air including means admitting air into said chamber, and means sprinkling the fuel from the fuel pump into the chamber, the sprinkling means including a tube extending axially into the chamber and having a multiplicity of perforations therein such that the fuel is sprinkled through the perforations into the chamber; a two-way safety valve including means permitting flow of fuel vapor and air from the evaporation chamber to the intake manifold for preventing backfire from reaching the chamber but rather venting off said backfire; means connecting said two-way safety valve to the intake manifold; and means for recycling fuel that accumulates in said chamber so that such fuel can be again sprinkled into the chamber, wherein the recycling means includes a secondary fuel tank, a secondary fuel pump, and fuel lines respectively connecting the evaporation chamber to the secondary fuel tank, the secondary fuel tank to the secondary fuel pump, and the secondary fuel pump to the first-mentioned fuel tank so that fuel is returned to the latter from the evaporation chamber.

4. An economizer system for use with an internal combustion engine having a fuel tank, a fuel pump, means for feeding fuel from the tank to the pump, an intake manifold, and at least one exhaust conduit, comprising a generally cylindrical fuel evaporation chamber in which fuel vapors are mixed with air including means admitting air into said chamber, and means sprinkling the fuel from the fuel pump into the chamber, the sprinkling means including a tube extending axially into the chamber and having a multiplicity of perforations therein such that the fuel is sprinkled through the perforations into the chamber; a two-way safety valve including means permitting flow of fuel vapor and air from the evaporation chamber to the intake manifold while preventing backfire from reaching the chamber but rather venting off said backfire; means connecting said two-way safety valve to the intake manifold;

UNITED STATES PATENT AND TRADEMARK OFFICE
CERTIFICATE OF CORRECTION

Page 2 of 2

PATENT NO. : 4,441,477
DATED : April 10, 1984
INVENTOR(S) : George R. Holt

It is certified that error appears in the above-identified patent and that said Letters Patent is hereby corrected as shown below:

and means for recycling fuel that accumulates in said chamber to the fuel tank so that such fuel can be again sprinkled into the chamber, wherein the recycling means includes heat exchanging means in contact with said exhaust conduit for exhaust heating the recycled fuel returned as liquid to said fuel tank.

Signed and Sealed this

Twenty-sixth Day of February 1985

[SEAL]

Attest:

DONALD J. QUIGG

Attesting Officer

Acting Commissioner of Patents and Trademarks